United States Patent [19]
Halstead

[11] Patent Number: 5,186,243
[45] Date of Patent: Feb. 16, 1993

[54] COMBINATION CONDENSER AND RADIATOR TANK THERMAL GAP

[75] Inventor: Gary A. Halstead, Lockport, N.Y.

[73] Assignee: General Motors Corporation, Detroit, Mich.

[21] Appl. No.: 912,377

[22] Filed: Jul. 13, 1992

[51] Int. Cl.⁵ .............................................. F28F 13/14
[52] U.S. Cl. ................................... 165/135; 165/140; 165/173
[58] Field of Search ................ 165/140, 135, 173, 176

[56] References Cited

U.S. PATENT DOCUMENTS

| 4,770,240 | 9/1988 | Dawson et al. | 165/176 |
| 5,000,257 | 3/1991 | Shinmura | 165/140 |
| 5,009,262 | 4/1991 | Halstead et al. | 165/140 |
| 5,033,540 | 7/1991 | Tategami et al. | 165/135 |

FOREIGN PATENT DOCUMENTS

| 2423440 | 11/1975 | Fed. Rep. of Germany | 165/140 |
| 3-156297 | 7/1991 | Japan | 165/135 |

Primary Examiner—Allen J. Flanigan
Attorney, Agent, or Firm—Patrick M. Griffin

[57] ABSTRACT

A combination radiator and condenser apparatus has a pair of extruded tank and header assemblies adapted to be connected in both a coolant system for liquid cooled engine and a refrigerant system of an automobile air conditioning system. The assemblies each include an extruded tank with two chambers separated by an internal partition which extends the full height of the tank. Each extruded tank further includes a slotted wall for receiving the ends of a plurality of unitary extruded fluid flow tubes extending between each extruded tank. Each of the unitary extruded fluid flow tubes has first and second passages therein connected respectively to the coolant chamber and the high pressure refrigerant chamber of each of the extruded tanks. An open-sided gap or channel extends within the partition and the length of the tank for reducing heat conduction between the coolant and refrigerant. The channel is open through a longitudinal wall of the extruded tank.

2 Claims, 1 Drawing Sheet

COMBINATION CONDENSER AND RADIATOR TANK THERMAL GAP

TECHNICAL FIELD

The invention relates to an apparatus in a motor vehicle having a liquid cooled engine and an air conditioning system, and more particularly to a combination radiator and condenser apparatus having parallel tube passes of the type having air centers for directing the inlet air stream of the vehicle through the separate tube passes in separate radiator and condenser portions of the combination radiator and condenser apparatus.

BACKGROUND OF THE INVENTION

Motor vehicle cooling systems for cooling engine coolant and refrigerant vapor are known in which a refrigerant condenser unit is located upstream from the cooling air inlet side of the radiator for extracting heat from the coolant system for a liquid cooled engine. Such refrigerant condensers have separate air centers and the radiator has separate air centers.

In order to meet space and weight design constraints and inlet air stream flow patterns in a motor vehicle, a combined radiator and condenser apparatus has been utilized as disclosed in U.S. Pat. No. 5,009,262, issued Apr. 23, 1991 in the name of Halstead et al., and assigned to the assignee of the subject invention. The combination apparatus provides thin gauge, corrugated aluminum air centers which are common for both the radiator and condenser, and each of the radiator and condenser units share a common tank member and common header plates. An extruded tank has an integral internal partition which separates the extruded tank into a coolant chamber and a high pressure refrigerant chamber. The tube passes of both the radiator and the condenser are bonded to an integral wall of the extruded tank at tube access slots therein. The tubes have the same air centers for defining a single air flow pass through both the radiator and the condenser.

A concern is the heat conduction between the coolant tank and refrigerant tank. The coolant has a temperature approximately 100° F. higher than that of the refrigerant. This temperature difference results in the heat conduction from the coolant to the refrigerant, reducing the performance of the air conditioning system.

It has been proposed to utilize narrow slits to prevent such heat conduction. The slits are located within the extruded tank wholly extending within the partition walls thereof and having open ends at the ends of the longitudinal tanks, as proposed in U.S. Ser. No. 07/863,905. However, this design is of higher cost for extrusion tooling, and also may be prone to plugging at the ends by corrosive road salt.

SUMMARY OF THE INVENTION

A combination radiator and condenser apparatus for a motor vehicle has a plurality of parallel tube passes for cooling high pressure refrigerant vapor in an air conditioning system for the motor vehicle and for cooling engine coolant. Air centers are bonded to the tube passes for cooling fluid flow through the parallel tube passes. The apparatus includes the parallel tube passes each including a flow tube with aligned segments forming a refrigerant passage and a separate coolant passage. Also included are a pair of unitary tank and header units. Each of the tanks and header units include a coolant space communicating with the coolant passages for flow of coolant therethrough, and a high pressure refrigerant space for communicating the refrigerant passages with a mechanical refrigerant system for directing refrigerant vapor through the refrigerant passages for condensation therein. An internal partition in each of the tank and header units extends the length thereof to separate the coolant space from the high pressure refrigerant space. The partition includes an open-sided thermal gap extending therethrough for decreasing thermal conductivity between the coolant space and refrigerant space and having a longitudinal side open through the units.

Also included is a method of forming the combination radiator and condenser apparatus. The method includes the steps of: forming a unitary extrusion having a pair of elongated chambers therein with an internal partition therebetween joining a mounting wall and header wall; piercing the header wall to form a plurality of tube slots therein; inserting a plurality of precut tube passes in the tube slots; closing the ends of the chambers; sealing the header of the extrusion to the tube passes; and forming an open-sided channel in the partition with an open side through the mounting wall between the chambers for reducing thermal conductivity therebetween.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENTS

Figure 1:
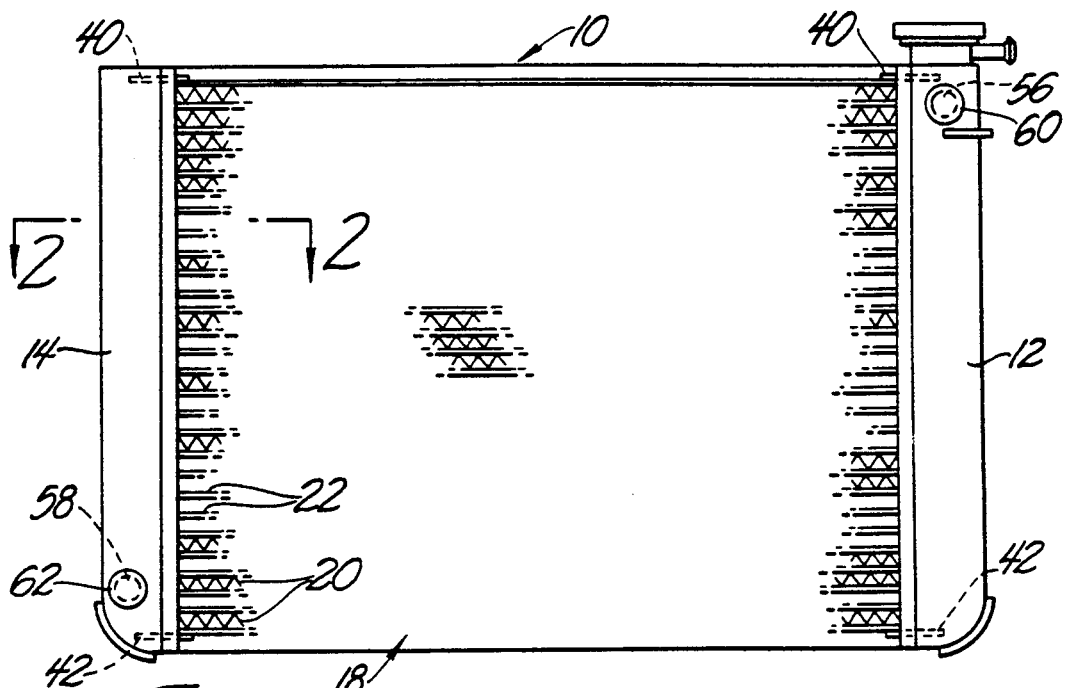
FIG. 1 is an enlarged front elevational view of the combination radiator and condenser apparatus.

Referring now to FIG. 1, a combination radiator and condenser apparatus 10 of the present invention is shown which is to be installed in the engine compartment of a motor vehicle having a liquid cooled engine and a refrigerant system of an air conditioning system.

As commonly known in the art, a coolant pump on the engine directs liquid from the coolant passages of the engine for discharge through an inlet fitting 56 of a coolant chamber 34 of an inlet tank 12 of the assembly 10. An outlet fitting 58 connects the coolant chamber 34 of an outlet tank 14 to a coolant jacket inlet. A radiator section 16 of the apparatus 10 is provided between the tanks 12 and 14. The radiator section 16 has a frontal flow area for unrestricted flow of the air intake stream.

The combination apparatus 10 includes a condenser section 18 which is connected to the discharge of a refrigerant compressor. The compressor discharges refrigerant at high pressure in gaseous vapor form to an inlet fitting 60 on the inlet tank 12 to the refrigerant chamber 36 of the condenser section 18. The condenser section 18 has the same frontal flow area as that of the radiator section 16. The radiator section 16 and the condenser section 18 share the same air centers 20 for preventing flow disturbances in the air intake stream of the vehicle across parallel tube passes 22 and air centers 20 therein to be described.

High pressure refrigerant vapor condenses in the condenser section 18 and the refrigerant exits the condenser section 18 through an outlet fitting 62 on the outlet tank 14 at high pressure but in a liquid form to a flow restrictor valve assembly to the evaporator. An electric motor driven blower blows air across the evaporator into the passenger compartment through a mode control duct system.

Low pressure refrigerant vapor exits the evaporator and is thence returned to the suction inlet of the compressor. U.S. Pat. No. 5,009,262, issued Apr. 23, 1991 in the name of Halstead et al, also assigned to the assignee of the subject application, is incorporated by reference herein and provides the basic structure of the apparatus 10 from which the subject invention provides modifications as subsequently discussed.

Figure 2:
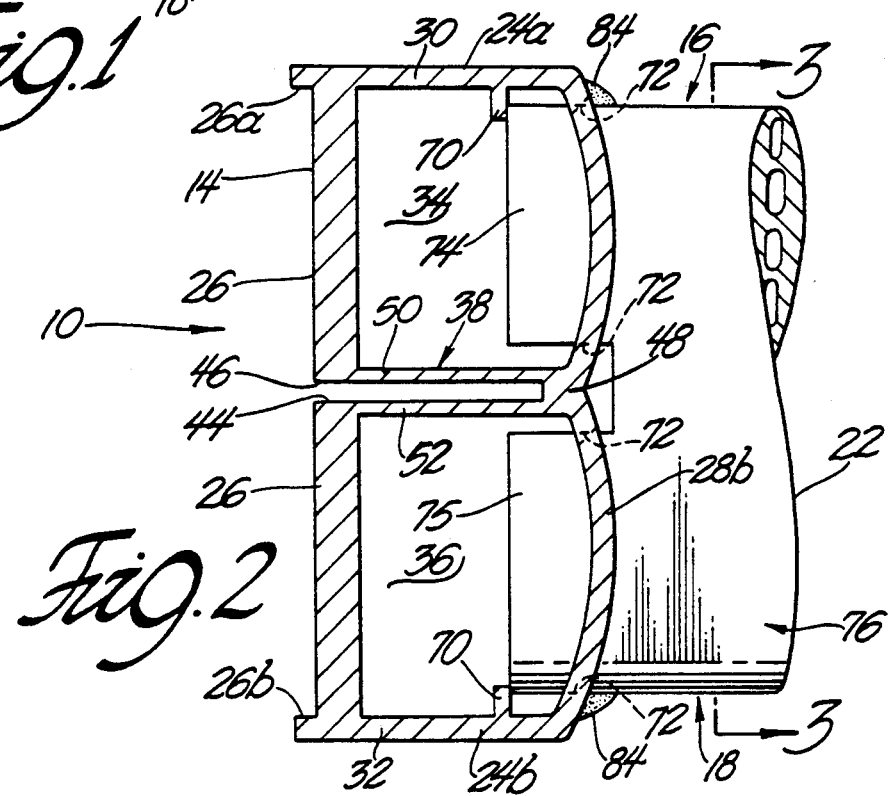
FIG. 2 is an enlarged fragmentary sectional view taken along lines 2—2 of FIG. 1 looking in the direction of the arrows of a first embodiment of the subject invention.

As best illustrated in FIG. 2, each of the inlet tank 12 and the outlet tank 14 is formed as an unitary extrusion 24 having a mounting rail 26 with side flanges 26a and 26b. The extrusion 24 also includes an integral header 28. The mounting rail 26 and the header 28 are common to both a radiator side 24a and a condenser side 24b of the extrusion 24. The mounting rail 26 and header 28 extend in a compact space saving parallel relationship as seen in FIG. 2. The rail 26 and header 28 extend through the vertical or longitudinal height of the inlet and outlet tanks 12, 14. The extrusion 24 has spaced integral side walls 30, 32 integrally joined to the mounting rail 26 and the header 28 to form open ended coolant and high pressure refrigerant chambers or spaces 34, 36. An integral internal partition 38 divides the chambers 34, 36 and seals therebetween. End closures 40, 42 are directed through the header 28 at the top and bottom thereof to close the open ends of the chambers 34, 36. The partition 38 integrally joins two integral arcuate header portions 28a, 28b for radiator section 16 and for condenser section 18, respectively.

As illustrated in FIG. 2, the internal partition 38 includes an open-sided, thermal gap or channel 44 extending therethrough for the length of the chambers 34, 36 in the tanks 12, 14. The channel 44 has a longitudinal side 46 open through the longitudinal dimension of the mounting rail 26. The channel 44 thereby forms a quiescent air pocket that defines a thermal barrier between the refrigerant and coolant flowing in the chambers 34, 36 of tanks 12, 14. Specifically, the thermal conductivity of air is approximately 7452 times less than that of aluminum. Therefore, the channel 44 significantly reduces the heat conduction from the coolant in chamber to the refrigerant in chamber 36. The channel 44 extends through the mounting rail 26 thence between chambers 34, 36 and toward the header 28. Channel 44 has an integral support stem 48 interconnecting the header 28 and separated, parallel walls 50, 52 of the partition 38 form the channel 44. The channel 44 extends for substantially the full height of the partition 38 and tanks 12, 14.

The inlet fitting 56 and outlet fitting 58 are connected to the side walls 30 to communicate the coolant hoses with the coolant chambers 34 in the inlet tank 12 and the outlet tank 14. The compressor discharge line is connected by the refrigerant inlet fitting 60 to the side wall 32 to communicate with the high pressure refrigerant chamber 36 in inlet tank 12 and the high pressure liquid line is connected by the refrigerant outlet fitting 62 to the side wall 32 to communicate with the refrigerant chamber 36 in the outlet tank 14.

The side walls 30, 32 have internal integral tube stops 70 therein, and the portions 28a, 28b of the header 28 have a plurality of spaced slots 72 on either side of the divider partition 38 so as to be aligned with the tube stops 70. The slots 72 receive end extensions 74, 75 on either end of a common tube extrusion 76 forming the tube pass 22 between the inlet tank 12 and the outlet tank 14. The end extensions 74, 75 engage the tube stops 70 to locate the end extensions 74, 75 in spaced relationship to the mounting rail 26 so as to define a gap therebetween for smooth flow of fluid from the ports of the tube extrusion 86 and the chambers 34, 36.

Figure 3:
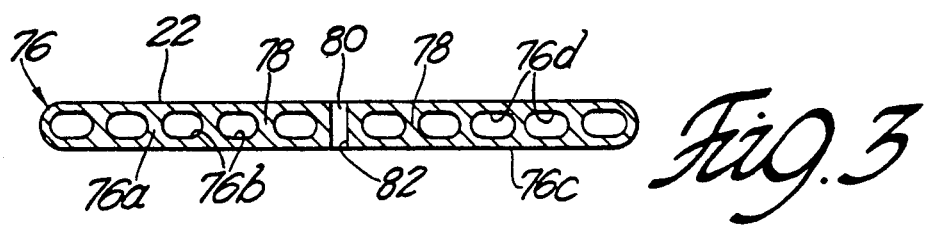
FIG. 3 is an enlarged fragmentary view taken along lines 3—3 of FIG. 2 looking in the direction of the arrows.

As shown in FIG. 3, the common tube extrusion 76 is shown having a coolant flow portion 76a with a plurality of separate coolant passages 76b. The tube 76 has a refrigerant flow portion 76c with a plurality of separate refrigerant flow paths 76d, each separated by reinforcing webs 78 formed integrally of the tube extrusion 76. The resultant structure defines a tube especially configured for use with a single air center 20 and configured for reinforcing the high pressure refrigerant flow contained therein. The form of the tube extrusion 76 may include any of the types set forth in the referenced patent.

A tube web 80 interconnects the coolant flow portion 76a and the refrigerant 76c flow portion. The tube web 80 includes a blind port or air space aperture 82 extending therethrough for the length of the extruded tube 76 with air freely flowing therethrough to isolate the coolant and refrigerant reducing heat conduction therebetween. Therefore, the air pocket created by the blind port 82 will help reduce the heat conduction from coolant to refrigerant significantly. The blind port 82 extends the width of the partition 38.

Cladding material on the outer surface of the tube extrusions 76 serves to form a brazed joint 84 between the tube extensions 74, 75 and the header 28 to prevent fluid leakage from the headers 28 where it joins to the tube extrusions 76.

As commonly known in the art, the air centers 20 are sinusoidally curved sheet metal members with peaks and valleys bonded to the surface of the tube passes 22 in conductive heat transfer relationship therewith for removing heat from the refrigerant flow paths 76c through the air center gaps, and thereafter the same air center 20 cools the coolant in the flow paths 76a.

Operation of the embodiment of FIGS. 1-3 includes directing either fan induced or ram jet air as inlet air stream flow against the leading edges of the tubes 76. The inlet air stream is passed across the surface and through the common air centers 20 which are bonded to the surface 76 for simultaneously removing heat by conductive heat transfer through the same air center element from both the radiator section 16 and the condenser section 18. In the case of the radiator section 16, heat is removed from the coolant being circulated through the flow path 76b by flow of coolant from the inlet fitting 56, to the coolant chamber 34 and into the radiator section of the outlet tank 14. From the outlet tank 14, the return coolant passes through the outlet fitting 58 and radiator hose to the coolant jacket inlet. Simultaneously, if the air conditioning is turned on an electromagnetic clutch is energized by suitable control means of a conventional form well known in the art. The compressor is thereby directly coupled to the engine output for compressing refrigerant vapor from the evaporator and discharging the refrigerant vapor into the high pressure refrigerant chamber 34. The refrigerant vapor is then passed through the tube extrusion 76 at the flow paths 76d therein where the vapor is cooled by direct conductive heat transfer to the common air centers 20.

The conductive heat transfer for both coolant and refrigerant is from the outer surface of the tubes 76. The conductive heat transfer causes the high pressure refrigerant vapor to cool and condense into high pressure liquid which is collected and expanded across the expansion valve for cooling the air flow across the evaporator.

Also included is a method of making the combination radiator and condenser apparatus 10. The method includes the steps of directing an extrudable material through an extruding die; shaping the extruding die to form a pair of elongated hollow members each having open ends with a longitudinal internal partition joined between a header wall and mounting wall; forming a longitudinal open-sided channel through the partition with an open longitudinal side through the mounting wall; closing the ends of the hollow members; piercing a plurality of tube slots in the header wall, and a pair of end closure slots in the header wall and a plurality of multi-pass partitions slots; precutting a plurality of tube lengths and inserting same into the tube slots; inserting the end closures and partitions to divide one of the chambers to form a serpentine flow path in the tube lengths; sealing the joined parts by providing cladding material on each joined part and brazing them to form sealed brazed joints.

The channel 44 through the mounting wall 26 eliminates a path of high thermal conductivity through the tanks 12,14 between the chambers 34, 36. The cost of tooling for forming the channel 44 through the mounting wall 26 is lower than other methods for reducing thermal contention between the condenser and radiator. Furthermore, the subject embodiment solves the prior art problem of plugging slits with corrosive road salt. The open area of the channel 44 through the mounting rail 26 is dimensioned so as to prevent build-up of dirt, salt or the like. Consequently, the channel 44 will serve to provide a desired thermal barrier during the operational life of the combination apparatus 10.

Having described preferred embodiments of the combination condenser and radiator assembly of the present invention according to the present invention and in a particularly useful application thereof, it will be understood by those skilled in the art that the desired application and embodiments are obtained by a very compact arrangement of a few easily assembled parts which enable a combination assembly to be used either for air conditioning or non air conditioning applications. In such preferred constructions there is basically one common tube member which serves to flow both coolant and refrigerant at the same time if desired. But it will be understood by those skilled in the art that the above-described preferred embodiments are illustrative of the invention and may be modified within the scope of the appended claims.

The embodiments of the invention in which an exclusive property or privilege is claimed are defined as follows:

1. A combination radiator and condenser apparatus for a motor vehicle having a plurality of parallel tube passes for cooling high pressure refrigerant vapor in an air conditioning system for the motor vehicle and for cooling engine coolant having air centers bonded thereto for cooling fluid flow through said parallel tube passes comprising:
   said parallel tube passes each including a flow tube with aligned segments forming a refrigerant passage and a separate coolant passage;
   a pair of longitudinally extending unitary tank and header units;
   each of said tanks and header units including a longitudinal coolant space communicating with said coolant passages for flow of coolant therethrough, and a longitudinal high pressure refrigerant space for communicating said refrigerant passages with a mechanical refrigerant system for directing refrigerant vapor through said refrigerant passages for condensation therein;
   an internal partition in each of said tank and header units extending the length thereof to separate said coolant space from said high pressure refrigerant space;
   air center means connected to each of said aligned flow tube segments for conductively transferring heat from said coolant and said refrigerant vapor, and
   said internal partition including an open-sided air channel extending in said partition with an open side longitudinally extending through said tank and header units for reducing thermal conductivity between said coolant space and said refrigerant space.

2. A combination radiator and condenser apparatus for a motor vehicle having a plurality of parallel tube passes for cooling high pressure refrigerant vapor in an air conditioning system for the motor vehicle and for cooling engine coolant having air centers bonded thereto for cooling fluid flow through said parallel tube passes comprising:
   said parallel tube passes each including a flow tube with aligned segments forming a refrigerant passage and a separate coolant passage;
   a pair of unitary tank and header units;
   each of said tanks and header units including a coolant space communicating with said coolant passages for flow of coolant therethrough, and a high pressure refrigerant space for communicating said refrigerant passages with a mechanical refrigerant system for directing refrigerant vapor through said refrigerant passages for condensation therein;
   said tanks and header units formed by a mounting wall, a header wall opposing said mounting wall and a pair of parallel side walls connected between said mounting wall and said header wall for forming a closed chamber, and an internal partition parallel with said side walls and connected between said mounting wall and header wall in each of said tank and header units extending the length thereof to separate said coolant space from said high pressure refrigerant space;
   air center means connected to each of said aligned flow tube segments for conductively transferring heat from said coolant and said refrigerant vapor, and
   said internal partition including an open-sided air channel extending therein having an open side through said mounting wall for reducing thermal conductivity between said coolant space and said refrigerant space.

* * * * *